(12) United States Patent
Shaw et al.

(10) Patent No.: US 10,757,435 B2
(45) Date of Patent: Aug. 25, 2020

(54) VIDEO FRAME DRIFT CORRECTION

(71) Applicants: HEWLETT-PACKARD DEVELOPMENT COMPANY, L.P., Houston, TX (US); PURDUE RESEARCH FOUNDATION, West Layfayette, IN (US)

(72) Inventors: Mark Shaw, Boise, ID (US); Jan P. Allebach, West Layfayette, IN (US); Edward J. Delp, West Layfayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/749,213

(22) PCT Filed: Jan. 22, 2016

(86) PCT No.: PCT/US2016/014587
§ 371 (c)(1),
(2) Date: Jan. 31, 2018

(87) PCT Pub. No.: WO2017/127115
PCT Pub. Date: Jul. 27, 2017

(65) Prior Publication Data
US 2018/0227590 A1    Aug. 9, 2018

(51) Int. Cl.
*H04N 19/503* (2014.01)
*H04N 19/172* (2014.01)
*H04N 19/132* (2014.01)
*H04N 19/67* (2014.01)
*H04N 19/176* (2014.01)
(Continued)

(52) U.S. Cl.
CPC ......... *H04N 19/503* (2014.11); *H04N 19/132* (2014.11); *H04N 19/14* (2014.11); *H04N 19/172* (2014.11); *H04N 19/176* (2014.11); *H04N 19/67* (2014.11); *H04N 19/86* (2014.11)

(58) Field of Classification Search
None
See application file for complete search history.

(56) References Cited

U.S. PATENT DOCUMENTS

| 6,498,814 B1 * | 12/2002 | Morel ................. H04N 19/105 375/240.12 |
| 8,654,844 B1 | 2/2014 | Hoang |
| 9,135,723 B1 | 9/2015 | Guo et al. |

(Continued)

FOREIGN PATENT DOCUMENTS

WO    WO2008075261 A1    6/2008

OTHER PUBLICATIONS

Yang, J.X et al, "Robust Filtering Technique for REduction of Temporal Fluctuation in H.264 Video Sequences", Nov. 3, 2009.
(Continued)

*Primary Examiner* — Mikhail Itskovich
(74) *Attorney, Agent, or Firm* — Brooks Cameron & Huebsch PLLC (57) ABSTRACT

In example implementations, a method executed by a processor is provided. The method determines an amount of video information that is lost in a video frame due to compression. A drift correction is applied to the video frame to add back a percentage of the amount of video information that is lost. The video frame is encoded with the drift correction.

13 Claims, 6 Drawing Sheets

400

(51) Int. Cl.
*H04N 19/14* (2014.01)
*H04N 19/86* (2014.01)

(56) References Cited

U.S. PATENT DOCUMENTS

| | | |
|---|---|---|
| 2004/0066793 A1* | 4/2004 | Van Der Schaar .... H04N 19/61 370/437 |
| 2004/0202249 A1 | 10/2004 | Lo et al. |
| 2009/0074084 A1 | 3/2009 | Drezner et al. |
| 2011/0216828 A1 | 9/2011 | Yang et al. |
| 2014/0233632 A1 | 8/2014 | Narroschke et al. |
| 2015/0010060 A1 | 1/2015 | Lei et al. |
| 2015/0334422 A1 | 11/2015 | Shaw et al. |

OTHER PUBLICATIONS

International Searching Authority., International Search Report and Written Opinion dated Oct. 31, 2016 for PCT Application No. PCT/US2016/014587 Filed Jan. 22, 2016, 11 pgs.
Gong Yanchao et al Perception-based quantitative definition of temporal pumping artefact 2014 19th International Conference on Digital Signal Processing, Aug. 20, 2014, pp. 870-875, XP032644189.
MarkQ. Shaw et al Temporal Drift Correction of Residues for Perceptually Based Video Compression Color Science and Engineering Systems, Technologies and Application 24th Color and Imaging Conference 2016 (CiC24) San Diego California USA Nov. 7-11 vol. 2016 No. 1, pp. 27-31 XP055537778.
Shaw Mark Q et al Color Difference Weighted Adaptive Residual Preprocessing Using Perceptual Modeling for Video Compression, Signal Processing, Image Communication, Elsevier Science Publishers Amsterdam NL vol. 39, Apr. 25, 2015 pp. 355-368 XP029304933.

* cited by examiner

VIDEO FRAME DRIFT CORRECTION

BACKGROUND

Video compression is used to reduce the size of video files, which allows video files to be processed, stored and transmitted more efficiently. Video compression takes advantage of predictive coding to remove redundant video frames without noticeably affecting the quality of video.

A variety of different video compression techniques and standards exist. Some video compression techniques and standards are applied to different types of frames of the video file (e.g., I frames, P frames and B frames) by analyzing macroblocks within the frame of video.

DETAILED DESCRIPTION

The present disclosure discloses an example apparatus and method for applying a temporal drift correction to video frames of a video. For example, video compression that takes advantage of predictive coding techniques are sensitive to error propagation due to the fact that the predictive accuracy of future frames are partially dependent on the perceptibility of the change from the frames previously encoded. As a result, the propagation of error may become noticeable to a viewer of the video when a reference frame (I-frame) reset occurs at a subsequent I-frame.

The propagation of error can be referred to as "drift." Example video coding processes use a set frame sequence, known as a group of pictures (GOPs), recursively in the processing of the video stream. Each GOP is bounded by an I-frame, which serves as a reset to encoding errors that may have accumulated during the processing of the previous GOP. If the total error accumulation in GOP is significant, the I-frame reset will likely result in a visible step.

The errors in the video can be approximated by the following function (1):

$$R = R_b + R_e + R_d,$$  Function (1):

where R is the original video being encoded, $R_b$ is a baseline encoding, $R_e$ is a reconstruction error of the video when compared to the original video and $R_d$ is an error due to temporal drift. The drift, or temporal drift, refers to the accumulation of small imperceptible errors that result in a visible "jump" during an I-frame reset.

Figure 6:
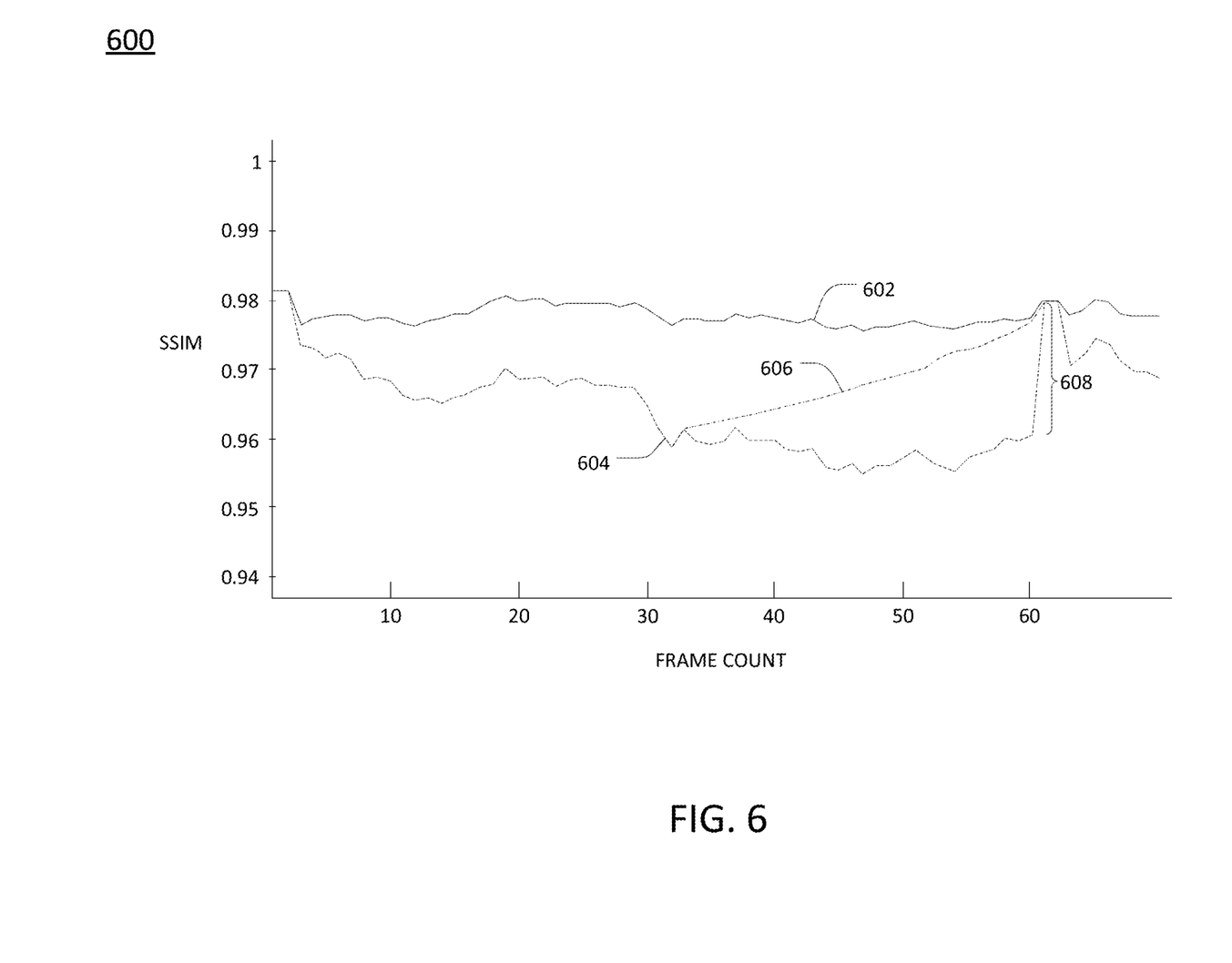
FIG. 6 illustrates a graphical example of drift correction.

In one example, the present disclosure corrects for the drift that occurs in certain compression techniques compared to a baseline compression technique. FIG. 6 illustrates an example chart 600 that provides a visual example of the drift correction. The chart 600 tracks an example measure of image quality using structural similarity (SSIM) over a number of frames (frame count). Although SSIM is used as one example of measuring image quality, it should be noted that other measures of image quality may also be used. SSIM is an example method for measuring a perceived image quality of a video. The chart 600 includes a line 602 that represents a baseline compression method. A dashed line 604 may represent a dynamic compression method that accumulates errors over time. As can be seen in FIG. 6, the dynamic compression method can accumulate errors over time causing the image quality (e.g., the SSIM value in FIG. 6) to steadily drop with each video frame that is processed. When an I-frame reset occurs at frame count 60, the dashed line 604 jumps as shown by a gap 608. The jump by the dashed line 604 is noticeable to viewers and can lead to an unsatisfactory viewing experience.

However, the present disclosure can apply a correction factor to residuals of the dynamic compression methods such that the image quality of the dynamic compression methods approach the image quality of the baseline compression method. For example, a dotted line 606 represents the drift correction that is applied to the dynamic compression methods represented by the dashed line 604. As can be seen in FIG. 6, once the drift correction begins, the accumulated errors are slowly removed, or compensated for, and the image quality delta diminishes until the dotted line 606 is near or at the line 602. As a result, no visible artifacts can be seen when the I-frame reset occurs at frame count 60.

Figure 1:
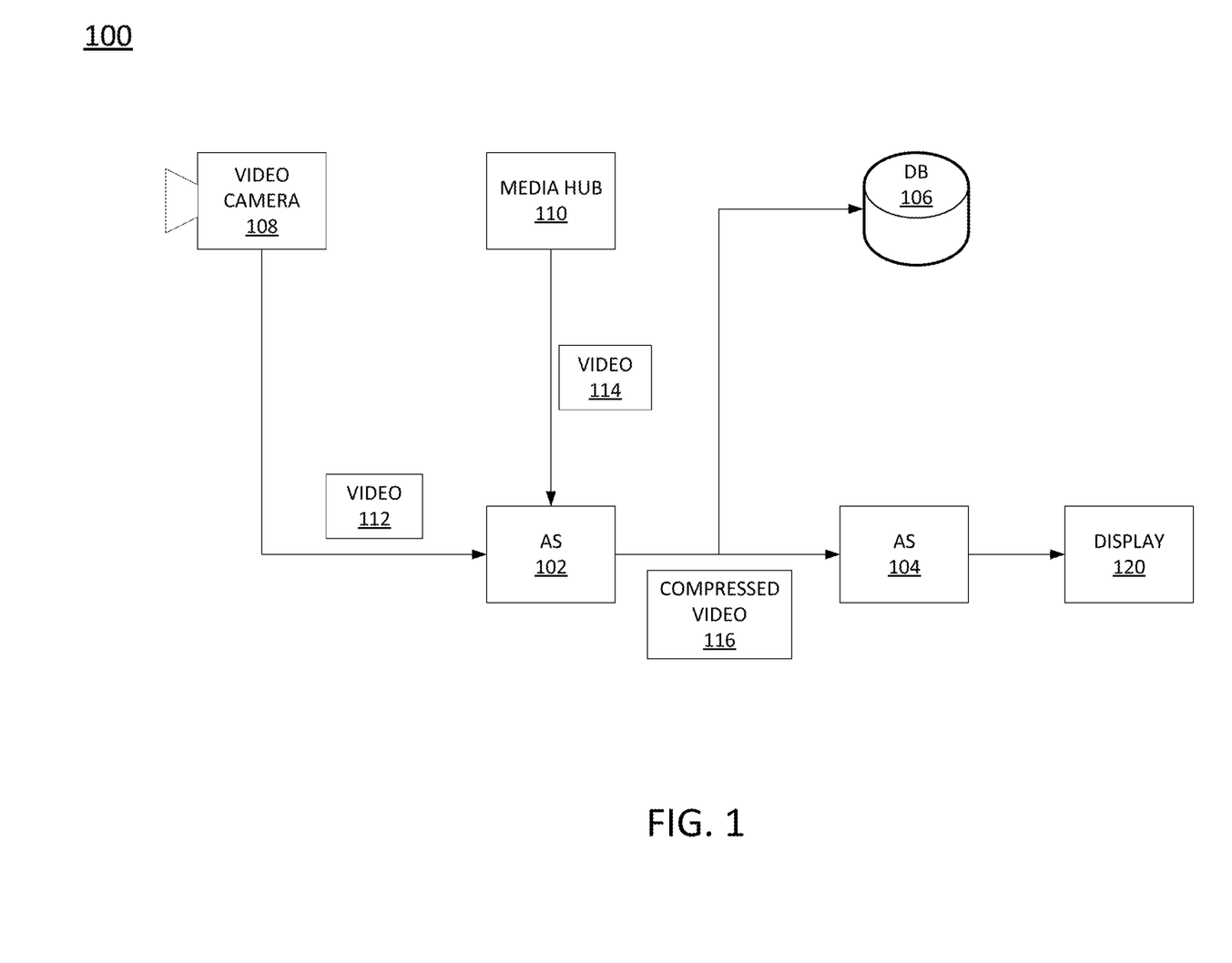
FIG. 1 is a block diagram of an example system of the present disclosure.

FIG. 1 illustrates an example system 100 of the present disclosure. In one example, the system 100 may include a first application server (AS) 102 and a second AS 104. In one example, the first AS 102 may include a processor and non-transitory computer readable storage medium that includes instructions that are executed by the processor to perform the methods and functions described herein. For example, the first AS 102 may be an encoder that encodes (e.g., compresses) a video 112 that is captured by a video camera 108 or a video 114 that is generated by, or retrieved from, a media hub 110.

In one example, the video 112 and the video 114 may be a sequence of video frames or images. The video 112 and video 114 may be encoded using I-frames, predictive frames (P-frames), and bi-predictive frames (B-frames). The video 112 and video 114 may be analyzed by the AS 102 using GOPs as described above and analyzing macroblocks of each video frame of a plurality of video frames of the GOPs.

In one implementation, the compressed video 116 that is generated by the first AS 102 may be outputted to the second AS 104 or a database (DB) 106. For example, the DB 106 may be a mass storage device that is used to store the compressed video 116 for later retrieval or processing.

In one implementation, the second AS 104 may be deployed as a hardware device having a processor and memory similar to the first AS 102. In one example, the second AS 104 may be a decoder that decodes the compressed video 116 displayed on a display device 120. The display device 120 may be a monitor, a television, and the like. As described above, the first AS 102 may encode the video 112 to reduce or eliminate the visual artifacts or the visual "jump" that is seen during an I-frame reset when the compressed video 116 is decoded and displayed on the display 120.

Figure 2:
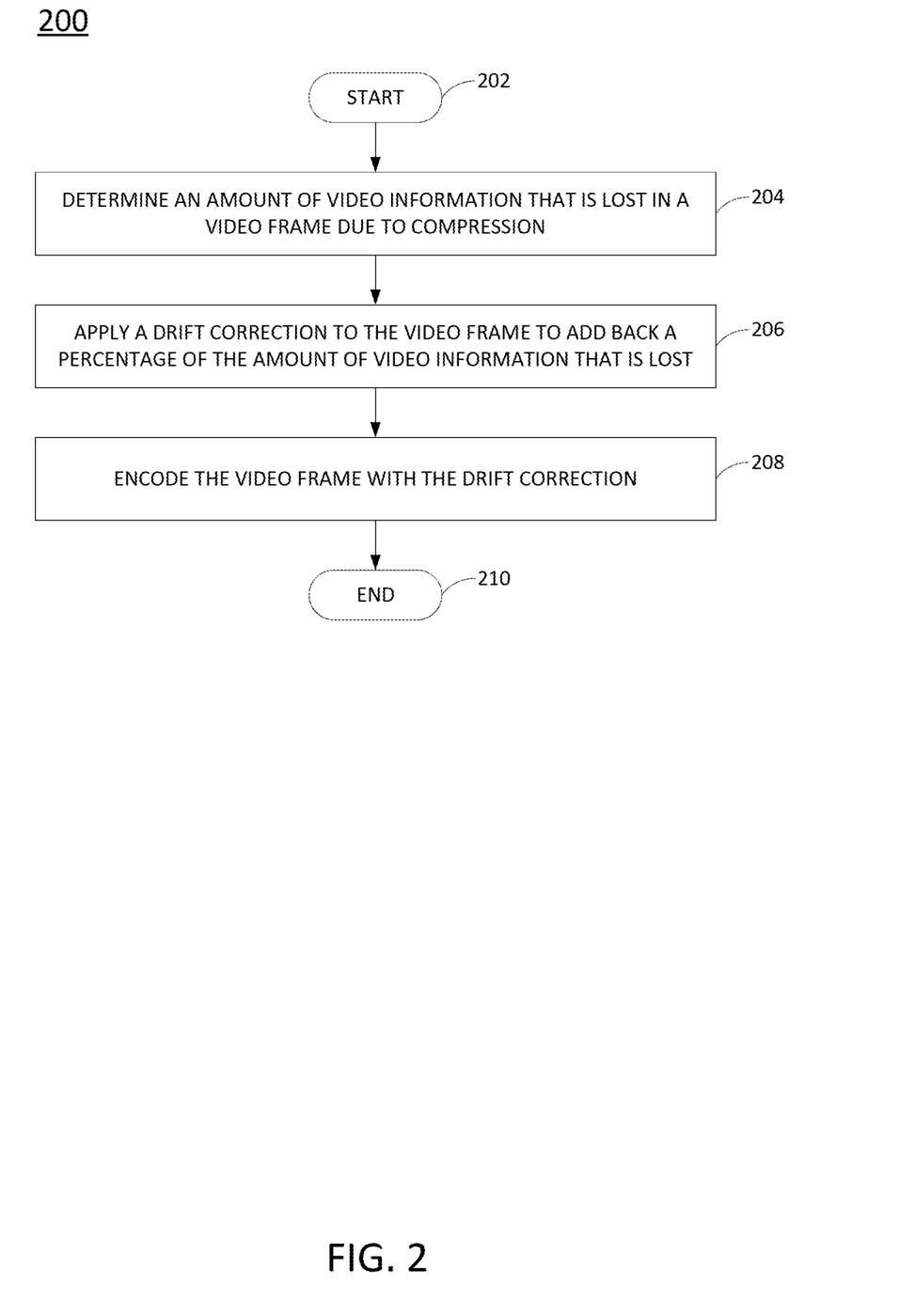
FIG. 2 is a flow diagram of an example method for applying a drift correction to a video frame.

FIG. 2 illustrates a flow diagram of an example method 200 for applying a drift correction to a video frame. In one example, the blocks of the method 200 may be performed by the first AS 102.

At block 202, the method 200 begins. At block 204, the method 200 determines an amount of video information that is lost in a video frame due to compression. For example, as each video frame is compressed the errors may accumulate over time for the entire video. Large amounts of compression or using certain dynamic compression techniques can lead to an accumulation of errors over time that lower the image quality (e.g., correlated to an SSIM value as shown in FIG. 6), as described above with reference to FIG. 6.

At block 206, the method 200 applies a drift correction to the video frame to add back a percentage of the amount of video information that is lost. In other words, some pixels that would be normally discarded in a macroblock or a video frame for compression may be added back in to reduce the accumulated errors over time. In one example, the percentage (e.g., the amount of video information that is added back in) of the drift correction may be associated with a drift compensation factor (β) that has a value between 0 and 1. In one example, β may be a function of a current frame position within a GOP, a next reference frame position with the GOP and a last reference frame position within the GOP. An example of a function (2) that is used to calculate β is provided below:

$$\beta_n = 2\left(\frac{\text{current frame position} - \text{last } I\text{-frame position}}{\text{next } I\text{-frame position} - \text{last } I\text{-frame position}}\right) - 1, \quad \text{Function (2)}$$

where $\beta_n$ represents the drift compensation factor at a current frame n. In one example, β may have a linear profile over time. In another example, β may have a quadratic profile over time.

In one example, determining when to start applying β may affect the optimal performance of the encoder. For example, if β is applied too early in time, then the advantage of compression is lost. However, if β is applied too late in time, then the I-frame reset becomes more visible. In one example, an optimal time to begin the application of β may be in a middle of two reference frames. For example, if a GOP included 60 frames, the method 200 may begin applying the drift correction beginning with the $31^{st}$ frame. Said another way, if the first I-frame begins at time i and the next I-frame begins at time i+n, then the method 200 may begin applying the drift correction at time (i+n)/2.

At block 208, the method 200 encodes the video frame with the drift correction. In one implementation, the blocks 204, 206 and 208 may be repeated for each video frame that is encoded once the application of the drift correction has begun. At block 210, the method 200 ends.

Figure 3:
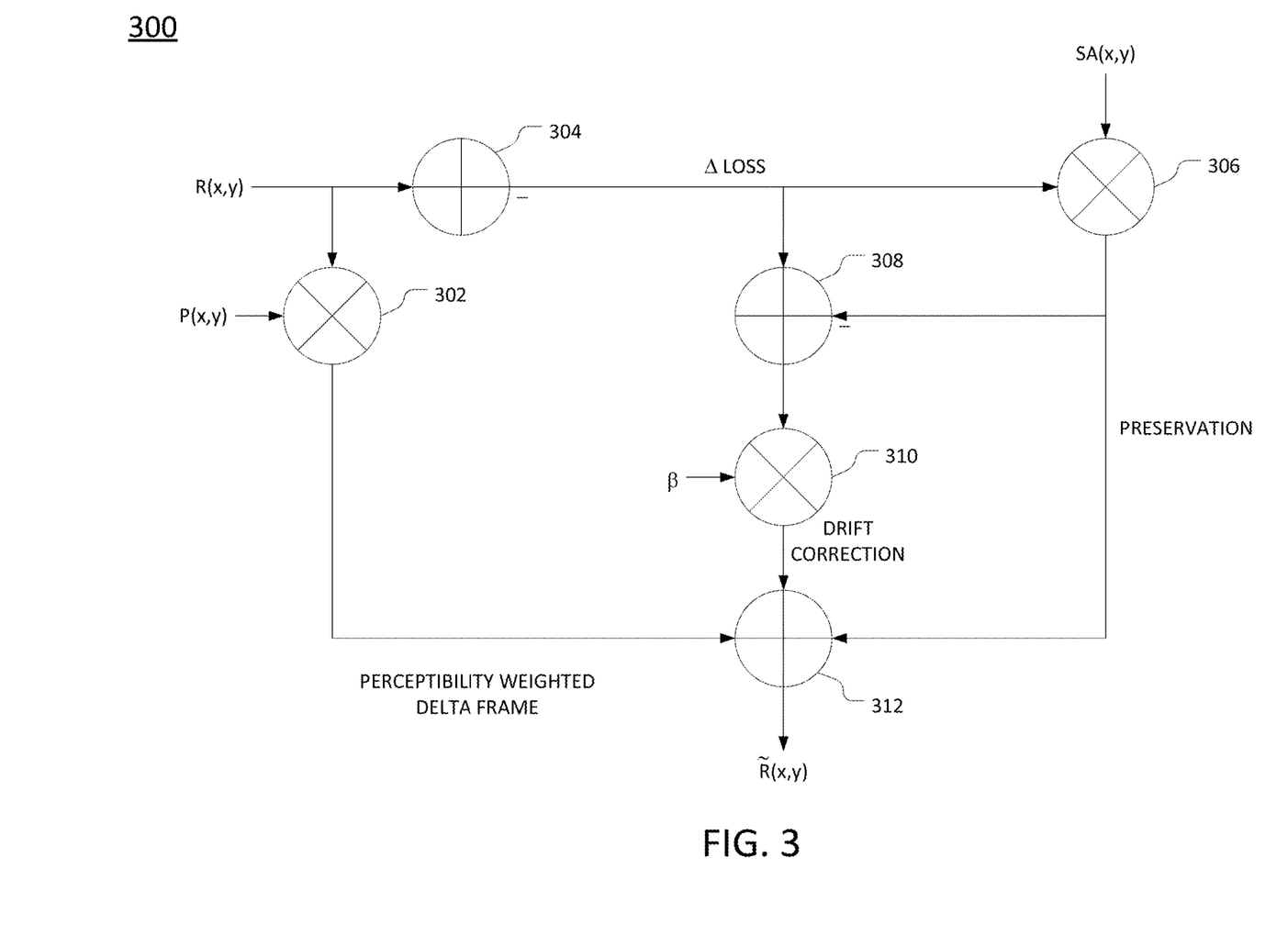
FIG. 3 is a video work flow diagram of an example method for applying a drift correction to a video frame.

FIG. 3 illustrates a video work flow diagram of an example method 300 for applying a drift correction to a video frame. In one example, the method 300 may be performed by the first AS 102, an apparatus 400 described below and illustrated in FIG. 4 or an apparatus 500 described below and illustrated in FIG. 5.

In one example, the method 300 may begin with a residue (R(x,y)) of a video frame. For example, the residue of a video frame may be obtained from motion block estimation that is performed on the B-frame or P-frame of a GOP. For example, a current macroblock of a B-frame or a P-frame can be predicted based on other macroblocks around the current macroblock or previous B-frames and P-frames. The residue may represent a difference between the predicted macroblock and an actual macroblock of the video frame.

At block 302, the residue may be multiplied with a perceptibility of the video frame (P(x,y)) to obtain a perceptibility weighted delta frame of the video frame. For example, the perceptibility weighted delta frame (Δweighted(x,y)) may be represented as Δweighted(x,y)=R(x,y)P(x,y).

In one example, perceptibility of the video frame may be obtained by mapping how visually important every pixel is for a video frame. Based on the map, the perceptibility may determine whether a pixel is visually important to be kept or not visually important to be discarded. This may also referred to as the encoding of residues.

At block 304, the method 300 may subtract the perceptibility weighted delta frame of the video frame from the residue to obtain a delta loss of the video frame. The delta loss of the video frame may represent the video information that was lost during compression. In one example, the delta loss (Δloss(x,y)) of the video frame may be represented as Δloss(x,y)=R(x,y)[1−P(x,y)].

At block 306, the method 300 may multiply the delta loss of the video frame by a spatial activity map (SA(x,y)) of the video frame to obtain a preservation of the video frame (e.g., a λ map). The spatial activity map provides an indication of how much motion is in the video frame. The spatial activity provides an indication of how important a pixel may be based on a spatial point of view. In one example, the preservation (Δpres(x,y)) may be represented as Δpres(x,y)=Δloss(x,y)[1−SA(x,y)]$^\rho$, where the exponent ρ is chosen to allow control of a relative weight assigned to low and high values of variance in a Lightness channel. In one example, the value of ρ may be chosen to be 2.2.

At block 308, the method 300 may subtract the preservation of the video frame from the delta loss of the video frame. The result from the block 308 may be fed to block 310.

At block 310, the method 300 may apply the drift correction. For example, the drift compensation factor, β, may be multiplied to the delta loss of the video frame to provide a drift correction of the video frame. In one example, the drift correction (Δdrift(x,y)) may be represented as $\beta_n$[Δloss(x,y)−Δpres(x,y)].

As discussed above, the block 310 may begin operating at a particular time between the first I-frame and a subsequent I-frame. In other words, the block 310 may operate on a subset of video frames of the plurality of video frames that are contained in a GOP that includes I-frames, B-frames and P-frames before the subsequent I-frame. For example, the block 310 may begin operating at a point in time that is the middle of the first I-frame and the subsequent I-frame.

At block 312, the method 300 may add the perceptibility weighted delta frame of the video frame, the drift correction of the video frame and the preservation of the video frame to obtain a modified residue of the video frame (R̃(x,y)). In one example, R̃(x,y) may be represented as R̃(x,y)=Δdrift(x,y)+Δweighted(x,y)+Δpres(x,y). The modified residue of the video frame may then be provided as an output to a subsequent video processing block and the method 300 ends.

Figure 4:
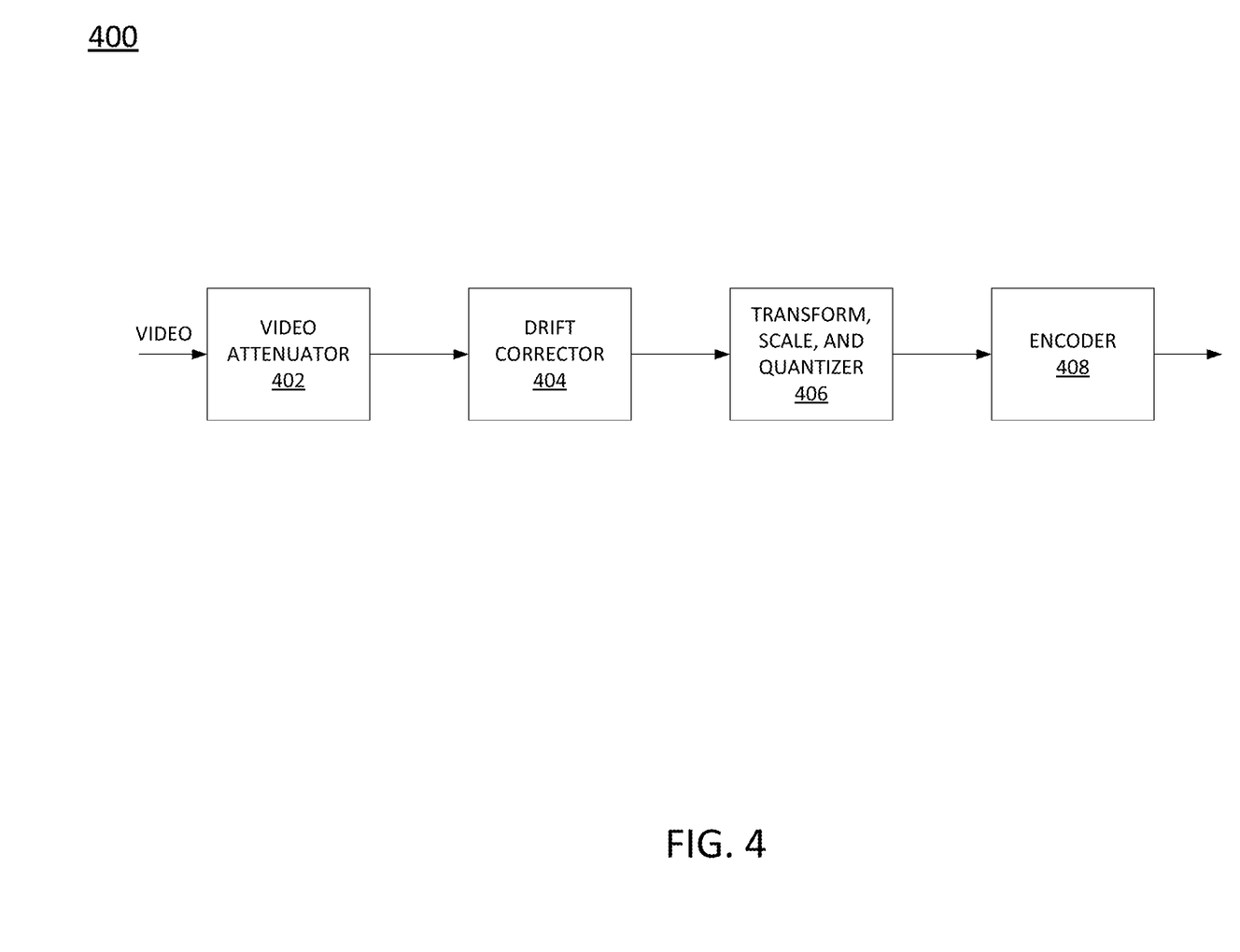
FIG. 4 is a block diagram of an example apparatus of the present disclosure.

FIG. 4 illustrates an example block diagram of an apparatus 400. In one example, the apparatus 400 may be deployed as the first AS 102 illustrated in FIG. 1. In one implementation, the apparatus 400 may include a video attenuator 402, a drift corrector 404, a transform, scale, and quantizer 406 and an encoder 408.

In one example, the video attenuator 402 may attenuate, or increase the gain, of the video (e.g., the video 112 or 114) to improve the compression of the video. In other words, the video attenuator 402 may increase a compression gain of the video and determine an amount of information that is lost in a video frame of a plurality of video frames of the video. In one example, the output of the video attenuator 402 may be represented as the residue R(x,y) described above.

In one example, the drift corrector 404 may apply a drift correction to a subset of the plurality of video frames to add back a percentage of the amount of information that is lost during compression. For example, the drift corrector 404 may include the operations illustrated in FIG. 3 and described above. In one implementation, the drift corrector 404 may selectively apply the drift correction beginning at a particular time and a particular video frame within a GOP. As described above, the particular time at which the drift corrector 404 begins applying the drift correction is a function of maximizing the amount of compression and minimizing a noticeable "jump" during an I-frame reset.

In one example, the drift corrector 404 may receive inputs from other functional blocks, such as a block that computes a spatial activity map. As described above, the drift corrector 404 may receive the SA(x,y) from the block that computes the spatial activity map.

In one example, the transform, scale, and quantizer 406 may perform a discrete cosine transform on the video. The encoder 408 may then perform the compression of the plurality of video frames based on the compression gain and the drift correction. The encoder 408 may then output the encoded video to mass storage device (e.g., the DB 106) for later retrieval or to a decoder (e.g., the second AS 104) for decompression and display.

It should be noted that FIG. 4 is a simplified block diagram of the apparatus 400. The apparatus 400 may include other functional blocks and processing flows that are not shown, such as for example, a feedback loop, a CIELAB transform block, a compute saliency map block, a motion compensation block, a motion estimation block, and the like.

Figure 5:
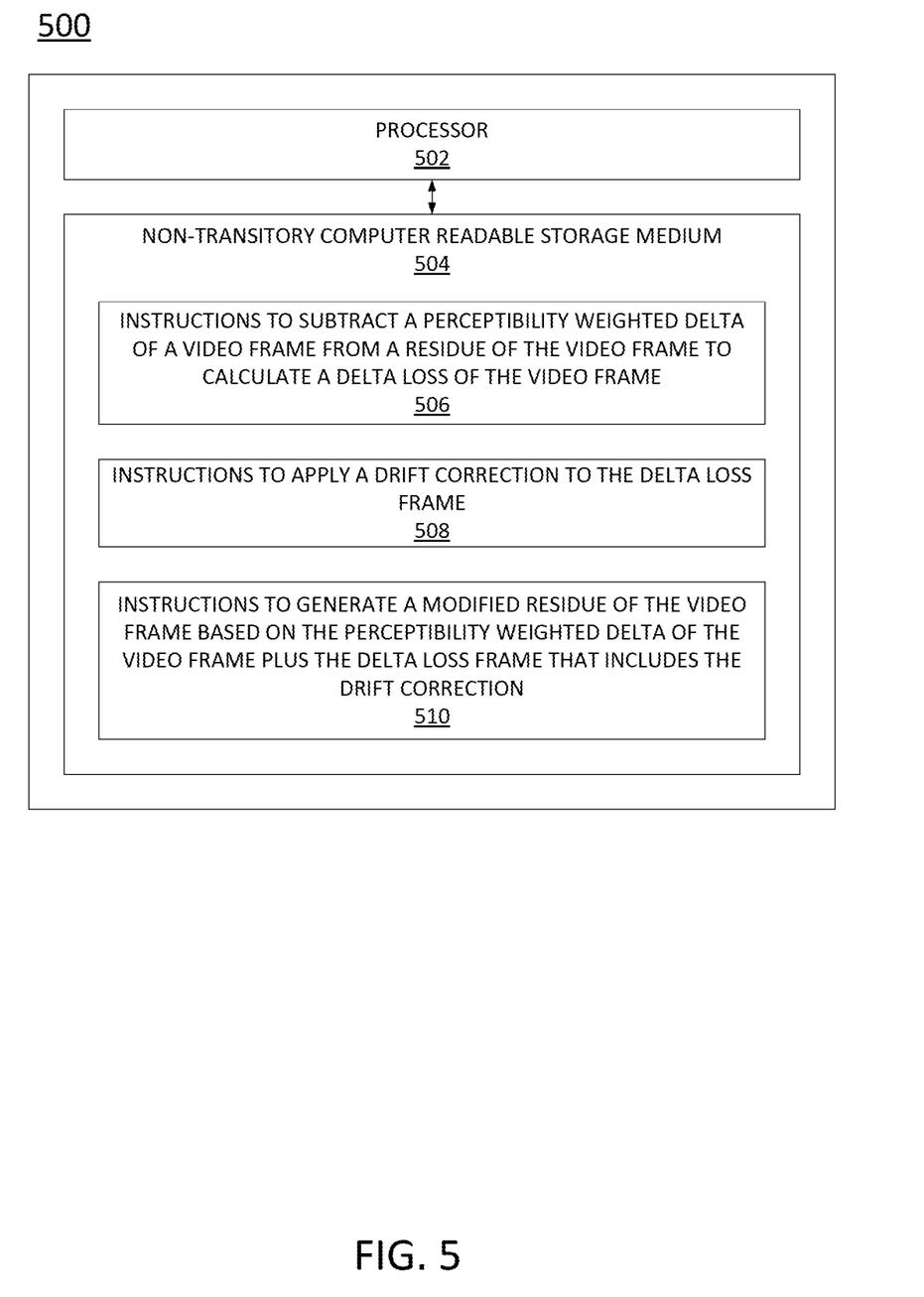
FIG. 5 is a block diagram of an example non-transitory computer readable medium storing instructions executed by a processor.

FIG. 5 illustrates an example of an apparatus 500. In one example, the apparatus may be the first AS 102 or part of the drift corrector 404. In one example, the apparatus 500 may include a processor 502 and a non-transitory computer readable storage medium 504. The non-transitory computer readable storage medium 504 may include instructions 506, 508 and 510 that when executed by the processor 502, cause the processor 502 to perform various functions.

In one example, the instructions 506 may include instructions to subtract a perceptibility weighted delta of a video frame from a residue of the video frame to calculate a delta loss of the video frame. The instructions 508 may include instructions to apply a drift correction to the delta loss frame. The instructions 510 may include instructions to generate a modified residue of the video frame based on the perceptibility weighted delta of the video frame plus the delta loss frame that includes the drift correction.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   determining, by a hardware device having a processor, a difference between a predicted macroblock of a video frame of a plurality of video frames between a first reference frame and a second reference frame and an actual macroblock of the video frame;
   determining, by the processor, an amount of information that is lost in the video frame due to compression based on the difference and a perceptibility of each pixel of the video frame;
   applying, by the processor, a drift correction to the video frame only when the video frame is one of a subset of video frames of the plurality of video frames beginning at time equal to (i+n)/2, where i is a time of the first reference frame and where n is a time of the second reference frame to add back a percentage of the amount of video information that is lost beginning at the time equal to (i+n)/2; and
   encoding, by the processor, the video frame with the drift correction to improve the image quality.

2. The method of claim 1, wherein the percentage comprises a drift compensation factor having a value between 0 and 1.

3. The method of claim 2, wherein the drift compensation factor has at least one of: a linear profile or a quadratic profile.

4. The method of claim 2, wherein the value of the drift compensation factor comprises a function of a current frame position within a group of pictures (GOP), a next reference frame position within the GOP, and a last reference frame position within the GOP.

5. An apparatus, comprising:
   a processor,
   a machine-readable storage medium storing instructions executable by the processor to:
      increase a compression gain of a video;
      determine a difference between a predicted macroblock of a video frame of a plurality of video frames of the video and an actual macroblock of the video frame;
      determine an amount of information that is lost in the video frame due to compression based on the difference and a perceptibility of the video frame;
      apply a drift correction to the video frame only when the video frame is one of a subset of the plurality of video frames between a first I-frame and a second I-frame beginning at a time equal to (i+n)/2, where i is a time of the first I-frame and where n is a time of the second I-frame following the first I-frame, wherein to apply the drift correction includes to add back a percentage of the amount of information that is lost beginning at the time equal to (i+n)/2;
      perform a discrete cosine transform; and
      compress the plurality of video frames based on the compression gain and the drift correction to improve the image quality.

6. The apparatus of claim 5, wherein the percentage comprises a drift compensation factor having a value between 0 and 1.

7. The apparatus of claim 6, wherein the drift compensation factor has at least one of: a linear profile or a quadratic profile.

8. The apparatus of claim 6, wherein the value of the drift compensation factor comprises a function of a current frame position within a group of pictures (GOP), a next reference frame position within the GOP, and a last reference frame position within the GOP.

9. A non-transitory computer-readable storage medium encoded with instructions executable by a processor to improve a quality of an image, the computer-readable storage medium comprising:
   instructions to determine a residue of a video frame of a plurality of video frames between a first I-frame and a second I-frame from a difference between a predicted macroblock of the video frame and an actual macroblock of the video frame;

instructions to subtract a perceptibility weighted delta of the video frame from the residue of the video frame to calculate a delta loss of the video frame;

instructions to apply a drift correction to the delta loss of the video frame only when the video frame is one of a subset of video frames of the plurality of video frames, wherein the subset of video frames begins at a time equal to (i+n)/2, where i is a time of the first I-frame and where n is a time of the second I-frame; and instructions to generate a modified residue of the video frame based on the perceptibility weighted delta of the video frame plus the delta loss frame that includes the drift correction to improve an image quality.

10. The non-transitory computer readable storage medium of claim 9, wherein the instructions to generate the modified residue frame are also based on a delta preservation of the video frame, wherein the delta preservation of the video frame is based on a spatial activity map of the video frame, indicating an amount of motion in the video frame, multiplied by the delta loss of the video frame and adjusted by a relative weight assigned to variance values in a Lightness channel.

11. The system of claim 1, wherein the perceptibility of each pixel of the video frame is determined from a mapping of a visual importance of each pixel of the video frame indicating whether each pixel of the video frame is to be kept or discarded.

12. The apparatus of claim 5, including instructions executable by the processor to:

obtain a perceptibility of each pixel of the video frame based on a mapping of a visual importance of each pixel of the video frame indicating whether each pixel of the video frame is to be kept or discarded;

determine a perceptibility weighted delta of the frame by multiplying the difference by the perceptibility; and determine the amount of information that is lost in the video frame due to compression by subtracting the perceptibility weighted delta of the video frame from the difference.

13. The non-transitory computer readable storage medium of claim 9, including instructions to:

obtain a perceptibility of each pixel of the video frame based on a mapping of a visual importance of each pixel of the video frame indicating whether each pixel of the video frame is to be kept or discarded; and determine the perceptibility weighted delta of the frame by multiplying the difference by the perceptibility.

* * * * *